No. 769,885. PATENTED SEPT. 13, 1904.
J. N. BLEVENS.
CORN PLANTER.
APPLICATION FILED MAR. 15, 1904.
NO MODEL. 4 SHEETS—SHEET 1.
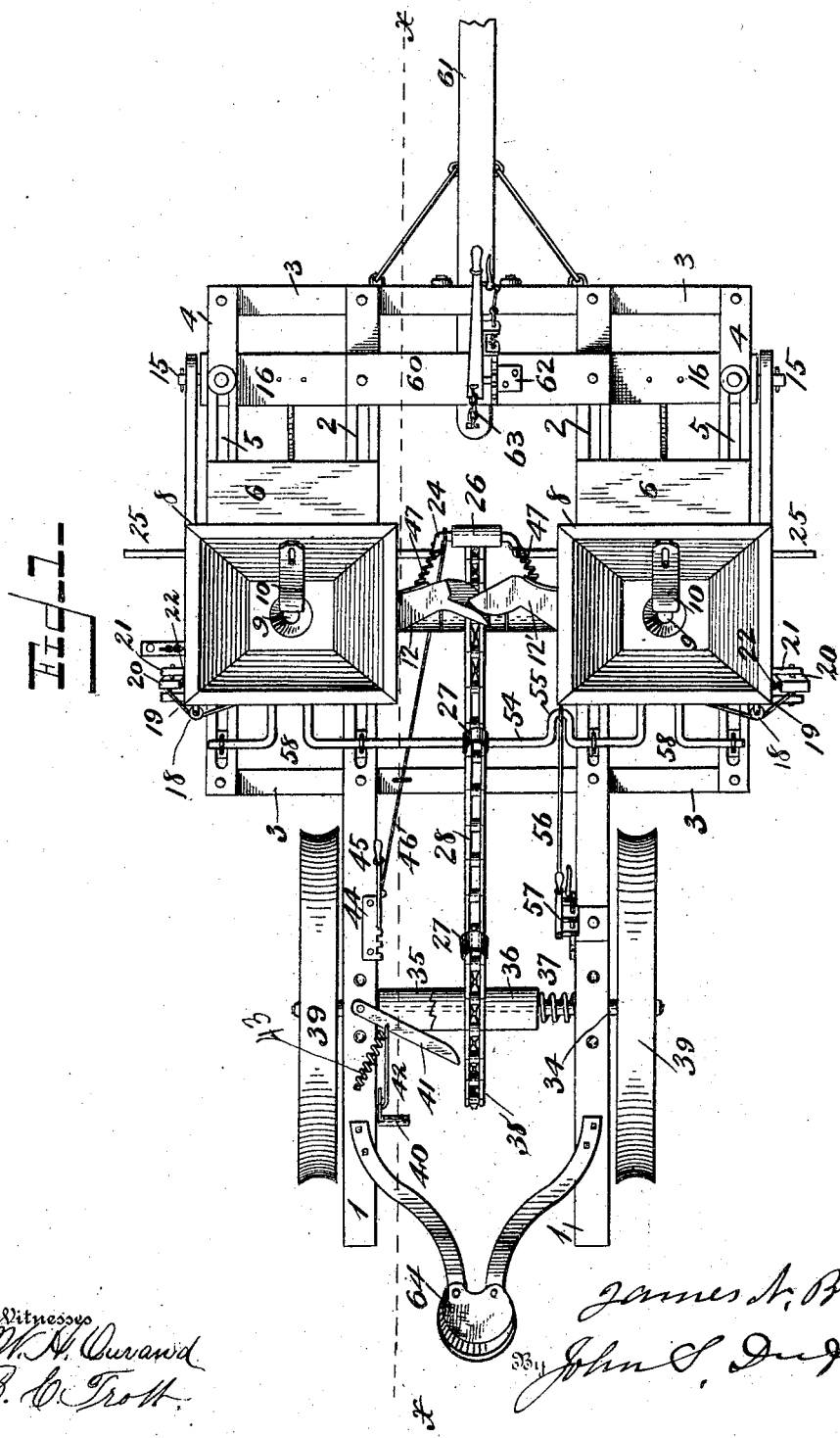

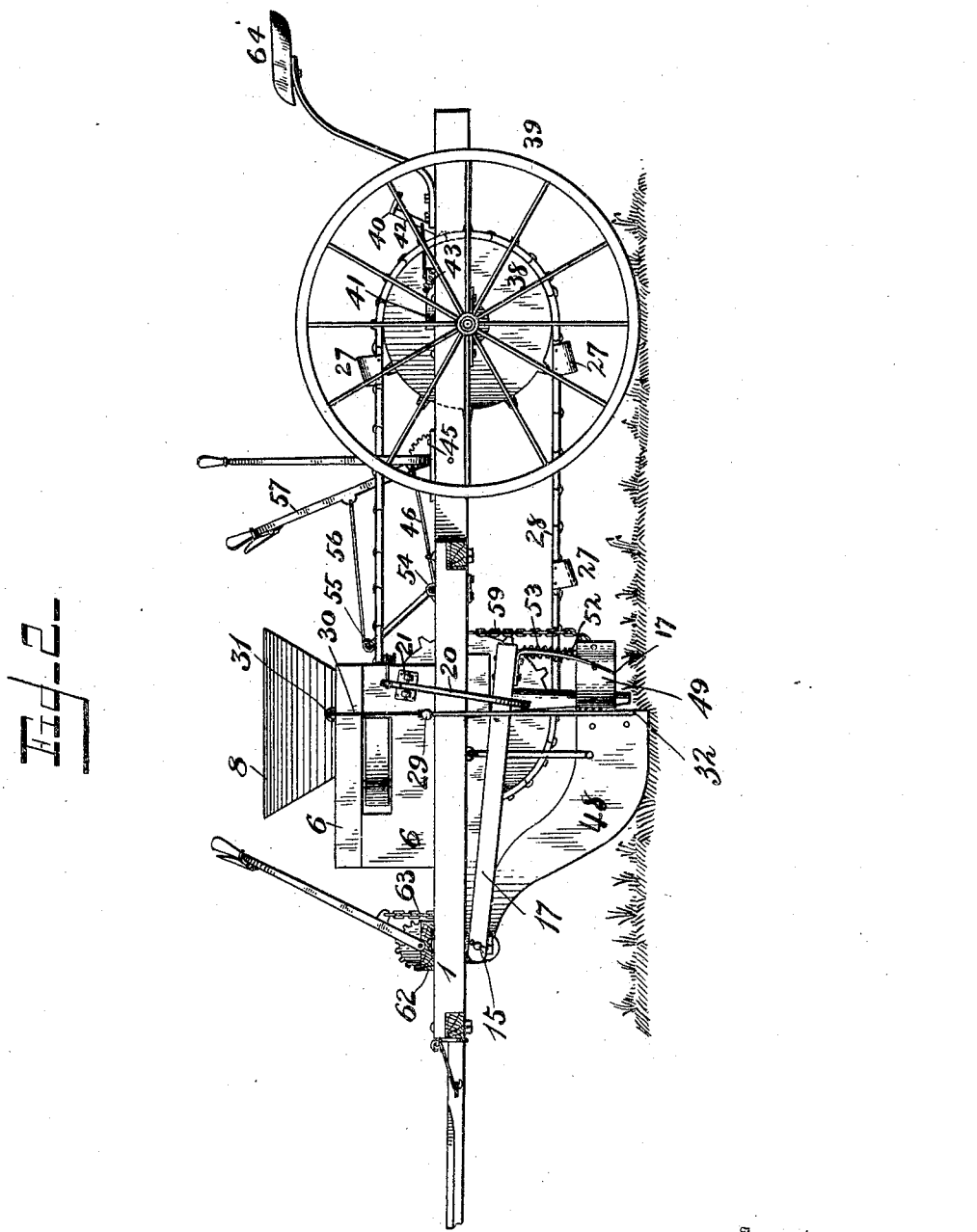

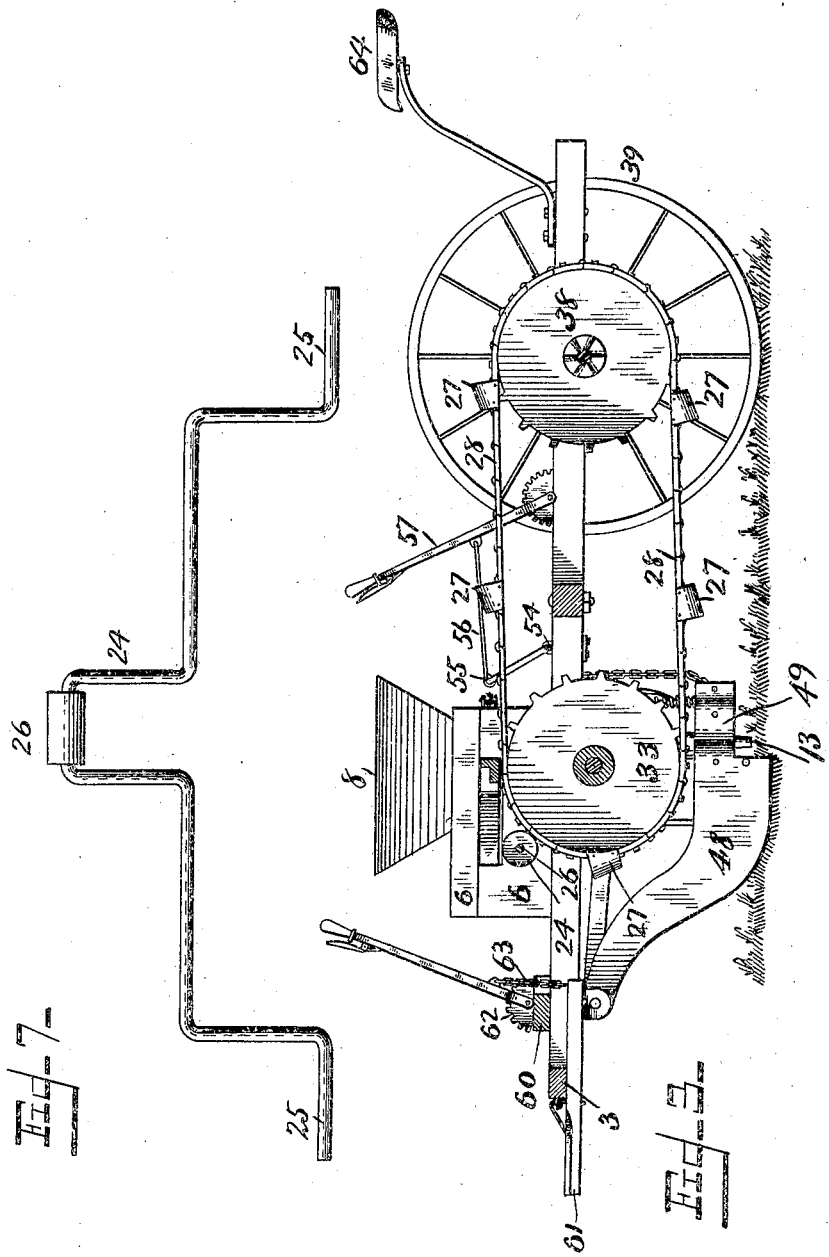

No. 769,885. PATENTED SEPT. 13, 1904.
J. N. BLEVENS.
CORN PLANTER.
APPLICATION FILED MAR. 15, 1904.
NO MODEL. 4 SHEETS—SHEET 4.
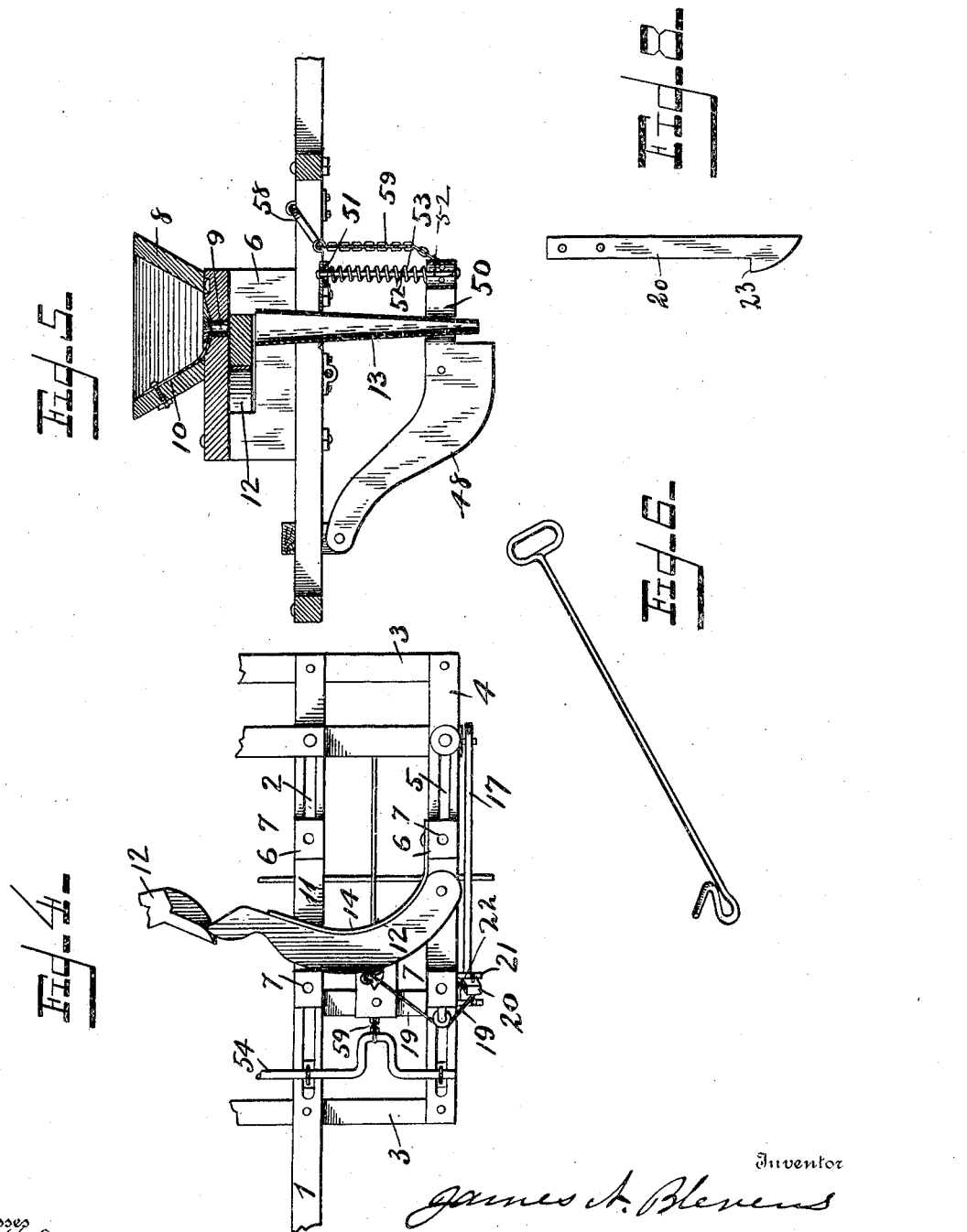

No. 769,885.                                                           Patented September 13, 1904.

UNITED STATES PATENT OFFICE.

JAMES N. BLEVENS, OF BENTONVILLE, ARKANSAS.

CORN-PLANTER.

SPECIFICATION forming part of Letters Patent No. 769,885, dated September 13, 1904.

Application filed March 15, 1904. Serial No. 198,276. (No model.)

*To all whom it may concern:*

Be it known that I, JAMES N. BLEVENS, a citizen of the United States, residing at Bentonville, in the county of Benton and State of Arkansas, have invented certain new and useful Improvements in Corn-Planters, of which the following is a specification.

My invention relates to corn-planters, and may be used for planting or dropping any kind of large grain. The main feature of this planter is that it drops the grain automatically.

The planter is so constructed that no wire is needed to drop the grain in hills and perfect rows on or across the field. This planter does not require the use of the knotted chain used on the ordinary corn-planter or grain-dropper. This dropper may be so adjusted that the drop or hills may be put from five inches to four feet apart by attaching more or less raised links to the endless belt or chain.

Irregular surface of the ground does not affect the perfect working of the machine.

In the drawings I have shown and in the specification I will now describe my double or two row corn-planter; but I also construct a single or one row machine, the parts of which are the same as the double row except it is constructed to plant but one row at a time, and therefore the following description and claims apply to the single-row as well as to the double-row machine.

In the accompanying drawings, Figure 1 is a top plan view of my double-row corn-planter. Fig. 2 is a side elevation of the same. Fig. 3 is a longitudinal vertical sectional view on the line $x\ x$ of Fig. 1. Fig. 4 is a detail view showing part of the lower frame and part of one of the elbow-levers used to elevate the plow, one of the droppers, and means for operating the same and for operating the marker. Fig. 5 is a detail view, partly in section, showing the hopper, the dropping-tube, the plow, a furrow-opener, and means for elevating the plow. Fig. 6 shows a device for moving the link chain forward if necessary. Fig. 7 is a side view of an elbow-lever to operate the markers, and Fig. 8 is a side view of one of the marker-supports.

My invention is described as follows:

1 represents the longitudinal beams of the lower frame, provided with longitudinal slots 2.

3 represents the rear and front cross-beams of the lower frame; 4, the side beams of the lower frame, provided with longitudinal slots 5.

6 represents the upper frames adjustably secured on top of the beams 1 and the side beams 4 by means of bolts 7, which pass down through said frames and through slots 2 and 5. On top of these frames are secured hoppers 8, each having in the center of its bottom a grain-dropping perforation 9 and secured to its wall adjustable regulators 10.

Journaled in the depressions 11 of the longitudinal beams of each of the upper frames 6 are dropper-arms 12 and 12′, dropper-arm 12 being so constructed with a lip and flange that when its free end is moved forward it also moves forward the free end of dropper-arm 12′, and when these arms are moved forward the grain-dropping perforations 9 of the hoppers are opened and the grain passes down into the dropping-tubes 13 and thence into the furrows. The dropping-arms 12 and 12′ are actuated by springs 14.

Journaled on the extended ends 15 of the cross-beam 16, situated near the front end of the lower frame, are marker-arms 17, and journaled to the rear ends of the upper side frames are pulleys 18. Secured to the rear edges of the dropper-arms 12 and 12′ is one end of cords 19, the other ends of said cords being secured in the upper ends of the marker-supports 20. The upper ends of these marker-supports are hinged in bearings 21, which extend from the rear ends and outside faces of the upper frames 6. The upper ends of these marker-bearings are pressed outwardly by coil-springs 22, so that the lower end of said marker constantly inclines inwardly and has on its inner edges a projection 23, which catches under and holds up the free end of the marker 17, and every time the drop-levers are moved forward the lower ends of said drop-supports are thrown out and the markers are let fall at the same time the grains fall. Pivoted in the lower cross-frames is a double-elbow lever 24 and 25. On the central elbows 24 is a roller 26. The central part of said lever is operated by projections 27 on a sprocket-chain 28 and operates the outer ends 25 of said lever, which in turn throws up the free ends of the said markers 17 and they are immediately caught and held by the projection 23 on the marker-supports 20 until again released by the operation of the dropper-arms 12 and 12'.

Extending from one side of the framework is a rod 29, and hinged to said rod is a marker 32, the lower end of which extends down to the ground. Rigidly secured to the upper end of the said marker is one end of a spring 30, the upper end of said spring being loosely secured in a staple 31, whereby said marker may spring back when it strikes an obstacle.

Journaled near the front end and to the lower part and between the beams 1 is a sprocket-wheel 33, and journaled to the under part and near the rear ends of said central beam is an axle 34, and rigidly secured around said axle and between said central beams 1 is one part of a ratchet-clutch, 35, the other part, 36, of said ratchet being adjustably secured around said axle, said part 36 of said clutch being held in contact with the other part, 35, by a spiral spring 37, and rigidly secured around the part 36 of said clutch is a sprocket-wheel 38. Passing around said sprocket-wheels is a sprocket-chain 28.

Rigidly secured to the outer ends of the axle 34 are drive-wheels 39, so that when the planter moves forward the sprocket-chain moves around said sprocket-wheels and the projections 27 come in contact with the dropper-arms 12 and 12' and with the roller 36, and thus said arms, said lever 24, and said marker are operated as above described.

Hinged to one of the beams 1 is a foot-lever 40, connected to a small arm 41 by a rod 42, the purpose of this combination being to throw the machinery out of gear, the said small arm 41 being held out of contact with sprocket-wheel 38 by means of a spring 43.

Secured to one of the beams 1 and in front of the axle 34 is a lever-lock 44, and hinged under this lever-lock is lever 45, and extending from said lever 45 to the central elbow of the double elbow 24 25 is a rod 46, the purpose of this combination being to enable the operator to push the roller 26 forward and out of contact with the elevations on the sprocket-chain, so that the markers may not be operated when such operation is not desired; otherwise the said roller is held in contact with said sprocket-chain by two spiral springs 47, one on each side.

Hinged to the lower face of a cross-beam 16, near the front end of the lower frame, are plows or furrow-openers 48. Said openers 48 are each provided with rear extensions 49 and 50, and extending down between these extensions is the dropper or conducting tube 13. Extending from cross-beams 51, immediately in the rear of said dropper-tubes and down through extensions 49 and 50, are rods 52, and secured around said rods 52 are spiral springs 53. Journaled on the upper face of the lower frame is a triple-elbow rod 54, and to its central elbow 55 is secured one end of a rod 56, its rear end being secured to a lever device 57. Its end elbows 58 are each provided with a chain 59, the lower ends of which are secured to the extensions 49 and 50 of the plows 48. Thus by operating said lever device said plows may be elevated.

Secured on the upper faces of the beams 1 is a short cross-beam 60. Secured loosely to the under edge of the front beam 3 of the under frame is a tongue 61, its rear end extending back under said cross-beam 60, and secured on the upper part of said cross-beam 60 is a ratchet device 62, the lever of which is connected to the rear end of said tongue by a chain 63, the purpose of which is manifest.

Secured to the upper faces of beams 1 is a seat 64.

Having described my invention, what I claim as new, and desire to secure by Letters Patent, is—

1. The combination of the lower frame, consisting of central slotted beams, end beams and slotted side beams; upper side frames adjustably secured on the upper face of said frame; hoppers secured to said side frames; dropper-arms hinged to said frames under said hoppers, and actuated by suitable springs; dropper-tubes extending from said hoppers downwardly; sprocket-wheels journaled between the central beams of the first-mentioned frame, and adapted to be thrown in and out of gear by ratchet devices; a sprocket-chain working around said sprocket-wheels, and projections secured at intervals to the outer face of said sprocket-chain, said projections adapted to operate one of said dropper-arms, said operated dropper-arm operating the other, substantially as shown and described and for the purposes set forth.

2. The combination of the lower frame, the upper frame adjustably secured on the upper face of said lower frame; dropper-arms pivoted to said upper frame; dropper-supports, hinged on bearings extending on each side from said upper frame; springs adapted to throw the upper ends of said supports out and their under ends in, and cords, one end secured to the rear faces of said dropper-arms, their other ends to the upper ends of said support, and adapted to throw the upper ends of said supports in, and their lower ends out, thereby releasing the markers when said dropper-arms are thrown forward, substantially as shown and described and for the purposes set forth.

3. The combination of the lower frame; upper frames situated on the upper face of said lower frame; hoppers situated on said upper frames; markers hinged to each side of said lower frame; marker-supports hinged to the outer sides of the upper frames; springs forcing the upper ends of said supports outwardly and the lower ends inwardly; dropper-arms hinged under said hoppers; cords, one end secured to said arms, and the other to the upper ends of said supports; sprocket-wheels journaled in said lower frame; sprocket-chain passing around said sprocket-wheels, and projections extending from the face of said sprocket-wheels whereby said dropper-arms and marker-supports are operated, substantially as shown and described and for the purposes set forth.

In testimony whereof I affix my signature in presence of two witnesses.

JAMES N. BLEVENS.

Witnesses:
W. E. PATTON,
W. T. MAXWELL.